(12) United States Patent (10) Patent No.: US 11,936,921 B2
Huang (45) Date of Patent: Mar. 19, 2024

(54) METHOD FOR MANAGING NETWORK LIVE STREAMING DATA AND RELATED APPARATUS, AND DEVICE AND STORAGE MEDIUM

(71) Applicant: TENCENT TECHNOLOGY (SHENZHEN) COMPANY LIMITED, Guangdong (CN)

(72) Inventor: Liuwen Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 14 days.

(21) Appl. No.: 17/693,518

(22) Filed: Mar. 14, 2022

(65) Prior Publication Data

US 2022/0210485 A1 Jun. 30, 2022

Related U.S. Application Data

(63) Continuation of application No. PCT/CN2020/130005, filed on Nov. 19, 2020.

(30) Foreign Application Priority Data

Feb. 20, 2020 (CN) .......................... 202010104378.1

(51) Int. Cl.
*H04N 21/2187* (2011.01)
*H04N 21/2347* (2011.01)
(Continued)

(52) U.S. Cl.
CPC ..... *H04N 21/2187* (2013.01); *H04N 21/2347* (2013.01); *H04N 21/26216* (2013.01); *H04N 21/26613* (2013.01)

(58) Field of Classification Search
CPC .......... H04N 21/2187; H04N 21/2347; H04N 21/26216; H04N 21/26613
See application file for complete search history.

(56) References Cited

U.S. PATENT DOCUMENTS 8,005,227 B1 * 8/2011 Linnell ................. H04L 9/0894
380/278
8,994,778 B2 * 3/2015 Weiser ..................... H04N 7/15
348/14.09
(Continued)

FOREIGN PATENT DOCUMENTS

CN 1810028 A 7/2006
CN 103139217 A 6/2013
(Continued)

OTHER PUBLICATIONS

International Search Report for PCT/CN2020/130005 dated Feb. 19, 2021.
Written Opinion for PCT/CN2020/130005 dated Feb. 19, 2021.

*Primary Examiner* — Joshua D Taylor
(74) *Attorney, Agent, or Firm* — Sughrue Mion, PLLC

(57) ABSTRACT

A method for managing network live streaming data and a related apparatus, device and storage medium, the method includes: a stream pushing request transmitted by a data access device is received; a stream pushing parameter set based on a media content feature of stream pushing data from multiple data sources in the data access device is determined; a target port is then determined according to the stream pushing parameter; the stream pushing data transmitted by the data access device is further received through the target port; and the stream pushing data is pushed to a live streaming device, so that the live streaming device plays media content data in a network live streaming process. In
(Continued)

this way, a process of combining media content of multiple terminals and performing network live streaming is implemented.

17 Claims, 10 Drawing Sheets

(51) Int. Cl.
*H04N 21/262* (2011.01)
*H04N 21/266* (2011.01)

(56) References Cited

U.S. PATENT DOCUMENTS

| | | | |
|---|---|---|---|
| 11,119,985 B1* | 9/2021 | Alagianambi | G06F 9/541 |
| 2002/0015092 A1 | 2/2002 | Feder et al. | |
| 2006/0013212 A1* | 1/2006 | Singh | H04L 45/04 370/389 |
| 2008/0066122 A1* | 3/2008 | Igoe | H04N 21/43637 725/80 |
| 2009/0219992 A1* | 9/2009 | Wang | H04B 17/24 375/240.03 |
| 2011/0216164 A1* | 9/2011 | Luthra | H04N 21/44016 348/E13.064 |
| 2020/0267437 A1* | 8/2020 | Pantos | H04L 65/613 |

FOREIGN PATENT DOCUMENTS

| | | |
|---|---|---|
| CN | 105141971 A | 12/2015 |
| CN | 105635636 A | 6/2016 |
| CN | 106330753 A | 1/2017 |
| CN | 106803923 A | 6/2017 |
| CN | 109361893 A | 2/2019 |
| CN | 111225230 A | 6/2020 |

\* cited by examiner

METHOD FOR MANAGING NETWORK LIVE STREAMING DATA AND RELATED APPARATUS, AND DEVICE AND STORAGE MEDIUM

CROSS-REFERENCE TO RELATED APPLICATION(S)

This application is a continuation application of International Application No. PCT/CN2020/130005, filed on Nov. 19, 2020, which claims priority to Chinese Patent Application No. 202010104378.1, filed with the China National Intellectual Property Administration on Feb. 20, 2020, the disclosures of which are incorporated by reference in their entireties.

FIELD

The disclosure relates to the field of Internet technologies, and in particular, to technologies for managing network live streaming data.

BACKGROUND

With the development of Internet technologies, webcast rooms attract more and more users with the novel form and rich content. Different webcast rooms are usually used to play different live streaming content, and a terminal satisfies different viewing requirements of a user correspondingly by accessing different webcast rooms.

To enrich content of network live streaming, video stream pushing may be performed for an interaction process between a terminal and another terminal. For example, stream pushing of live streaming is performed for content of a current multi-person audio/video call. After transcoding or mixing of multiple streams, the content is distributed to a content delivery network (CDN), and then another user may pull the streams to watch based on an information transmission protocol.

However, because this relates to audio/video stream pushing of multiple terminals, if a network of an audio/video source fluctuates, this may affect the entire live streaming process and easily cause a live streaming delay. In addition, when an audio/video source becomes faulty, stream pushing blocking of live streaming may even be caused, affecting the stability of the network live streaming process combining multiple terminals.

SUMMARY

In view of this, the disclosure provides a method for managing network live streaming data and a related apparatus, which may effectively avoid a network live streaming delay caused by a parameter difference or a network environment difference between multiple pieces of media content, and improve the stability of a network live streaming process.

A first aspect of the disclosure provides a method for managing network live streaming data, performed by a multipoint control device. The method specifically includes: receiving a stream pushing request transmitted by a data access device, the stream pushing request including a stream pushing parameter, the stream pushing parameter being determined by the data access device based on a media content feature of to-be-transmitted stream pushing data, the stream pushing data including media content data from at least two data sources; determining, according to the stream pushing parameter, a target port adapted to the media content feature; receiving, through the target port, the stream pushing data transmitted by the data access device; and pushing the stream pushing data to a live streaming device, so that the live streaming device plays the media content data in a network live streaming process.

A second aspect of the disclosure provides another method for managing network live streaming data, performed by a data access device. The method specifically includes: receiving stream pushing data transmitted by at least two data sources; determining a stream pushing parameter according to a media content feature of the stream pushing data; transmitting the stream pushing parameter to a multipoint control device, the stream pushing parameter being used to instruct the multipoint control device to determine a target port adapted to the media content feature; receiving information of the target port that is transmitted by the multipoint control device; and transmitting the stream pushing data through the target port.

A third aspect of the disclosure may provide a managing network live streaming data related apparatus, including: at least one memory configured to store computer program code; and at least one processor configured to read the computer program code and operate as instructed by the computer program code, the computer program code comprising: scheduling code configured to cause the at least one processor to receive a stream pushing request transmitted by a data access device, the stream pushing request including a stream pushing parameter, the stream pushing parameter being determined by the data access device based on a media content feature of to-be-transmitted stream pushing data, the stream pushing data including media content data from at least two data sources; adaptation code configured to cause the at least one processor to determine, according to the stream pushing parameter, a target port adapted to the media content feature; media content code configured to cause the at least one processor to receive, through the target port, the stream pushing data transmitted by the data access device; and stream pushing code configured to cause the at least one processor to push the stream pushing data to a live streaming device, so that the live streaming device plays the media content data in a network live streaming process.

A fourth aspect of the disclosure may provide a network device, applicable to a network live streaming system. The network device may specifically include: access code configured to cause the at least one processor to receive stream pushing data transmitted by at least two data sources; and stream control code configured to cause the at least one processor to determine a corresponding stream pushing parameter according to a media content feature of the stream pushing data, the stream control code being further configured to cause the at least one processor to transmit the stream pushing parameter to a multipoint control device, the stream pushing parameter being used to instruct the multipoint control device to determine a target port adapted to the media content feature; the stream control code being further configured to cause the at least one processor to receive information of the target port that is transmitted by the multipoint control device; and the access code being further configured to cause the at least one processor to transmit the stream pushing data through the target port.

A fifth aspect of the disclosure provides a computer device, including: a memory, a processor, and a bus system, the memory being configured to store program code; and the processor being configured to perform the method for managing network live streaming data according to the first aspect or the method for managing network live streaming data according to the second aspect according to instructions in the program code.

A sixth aspect of the disclosure provides a non-transitory computer-readable storage medium, storing instructions, the instructions, when run on a computer, causing the computer to perform the method for managing network live streaming data according to the first aspect or the method for managing network live streaming data according to the second aspect.

A seventh aspect of the disclosure provides a computer program product, including instructions, the instructions, when run on a computer, causing the computer to perform the method for managing network live streaming data according to the first aspect or the method for managing network live streaming data according to the second aspect.

The multipoint control device receives the stream pushing request transmitted by the data access device; determines the stream pushing parameter set based on the media content feature of the stream pushing data from multiple data sources in the data access device; then determines the target port according to the stream pushing parameter, where the target port may be adapted to the media content feature of the stream pushing data; further receives, through the target port, the stream pushing data transmitted by the data access device; and pushes the stream pushing data to the live streaming device, so that the live streaming device plays media content data of the stream pushing data in a network live streaming process.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the specification, claims, and accompanying drawings of the disclosure, the terms "first", "second", "third", "fourth", and the like (if existing) are intended to distinguish between similar objects rather than describe a specific sequence or a precedence order. Data used in this way may be interchanged in an appropriate case, so that the embodiments of the disclosure described herein can be implemented in a sequence other than the sequence illustrated or described herein. In addition, the terms "include", "corresponding to" and any other variants are intended to cover the non-exclusive inclusion. For example, a process, method, system, product, or device that includes a series of operations or units is not necessarily limited to those expressly listed operations, units, or code, but may include other operations or units or code not expressly listed or inherent to such a process, method, product, or device.

First, some terms that may appear in the embodiments of the disclosure are explained as follows:

Multipoint control unit (MCU): A multipoint control unit, also referred to as a multipoint control device in the disclosure, is a core part of an audio/video conference system, and mainly functions to provide a connection service of a group conference and a multi-group conference for a user.

Selective forwarding unit (SFU): A selective forwarding unit is simply configured to forward audio/video data, and is not related to conversion and combination of audio/video data formats and parameters, and the like, and conversion and combination of audio/video data formats and parameters, and the like are processed by a viewing end after data is received.

Software development kit (SDK): A software development kit is a set of related documents, examples, and tools that assist development of a particular type of software.

Stream mixing: Stream mixing is a manner of control, synchronization, and mixing of video and audio data streams, that is, video and audio data is combined.

Stream pushing: Stream pushing is a process of transmitting content data encapsulated in a capturing stage to a specified device.

Figure 1:
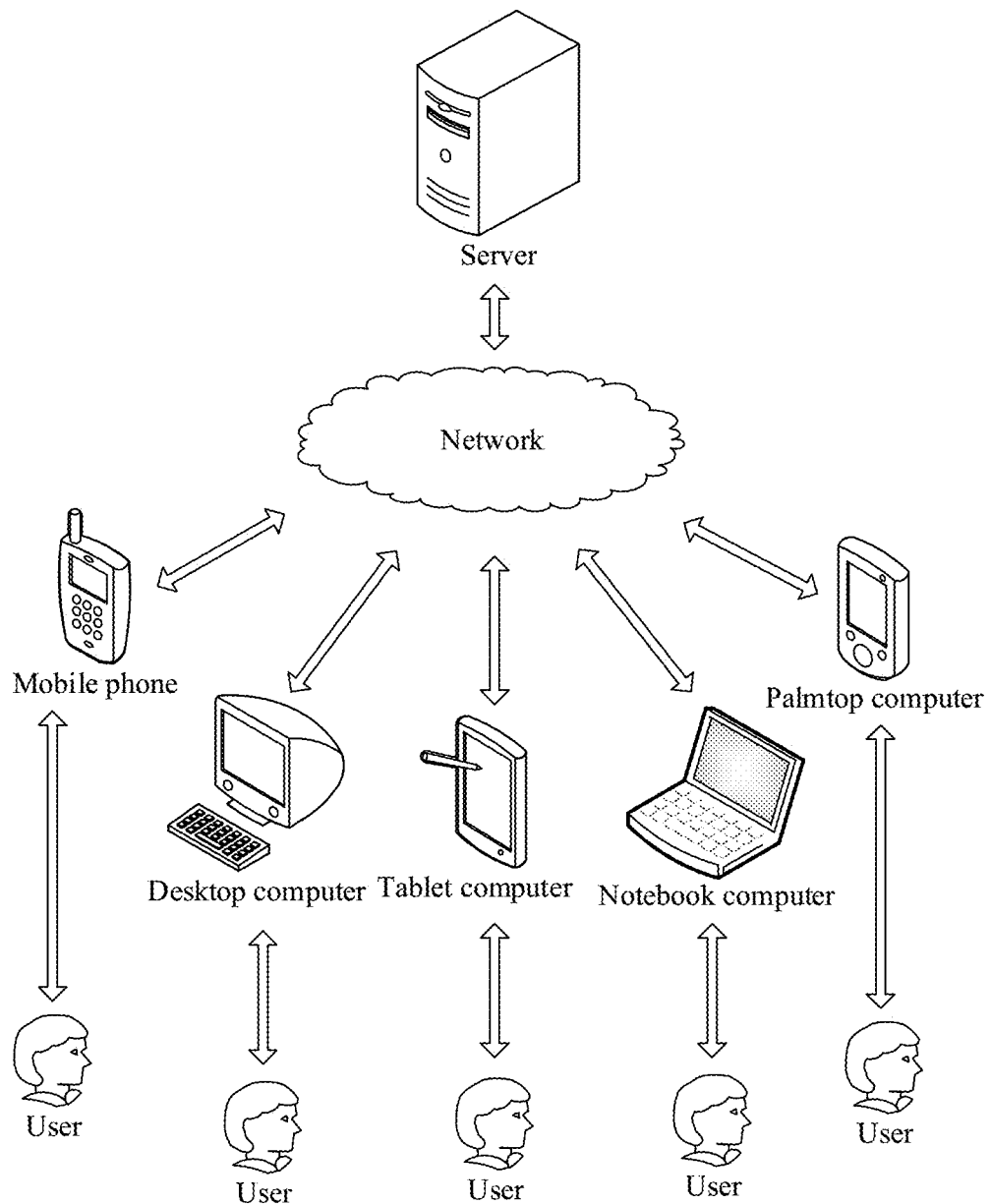
FIG. 1 is a diagram of a network architecture for running a data management system.

It is to be understood that a data management method provided in the disclosure is applicable to a system or a program supporting a network live streaming function, for example, a live streaming platform. Specifically, the system supporting a network live streaming function may run in the network architecture in FIG. 1. FIG. 1 is a diagram of a network architecture for running a system. As can be seen from FIG. 1, the system may exchange media content with multiple terminal devices. A terminal establishes a connection to a server through a network, and the server pushes, to a target terminal, an audio/video stream uploaded by the terminal, to implement network live streaming. It may be understood that, FIG. 1 shows multiple terminal devices. In an actual scenario, more or fewer terminal devices may participate in the network live streaming process, and a specific quantity and type depend on an actual scenario and are not limited herein. In addition, FIG. 1 shows one server, but in an actual scenario, there may be multiple servers. Especially, in a scenario of multi-content application interaction, a specific number of servers depends on an actual scenario.

It may be understood that the system for managing network live streaming data may run in the form of a program in the server, may run as a system component in the server, or may run as a cloud service program. A specific operation mode depends on an actual scenario and is not limited herein.

To resolve the problem that a network live streaming process of combination of media content of multiple terminals is unstable in the related technology, the embodiments of the disclosure provide a method for managing network live streaming data. The method is applicable to network live streaming of combination of media content of multiple terminals. In a stream pushing process, a target port is selected for the media content of multiple terminals, so that the media content of the multiple terminals is better combined and adapted to a live streaming device. This reduces the live streaming delay caused by network fluctuation, avoids stream pushing blocking of live streaming caused by an occasional situation, and improves the stability of the network live streaming process.

Figure 2:
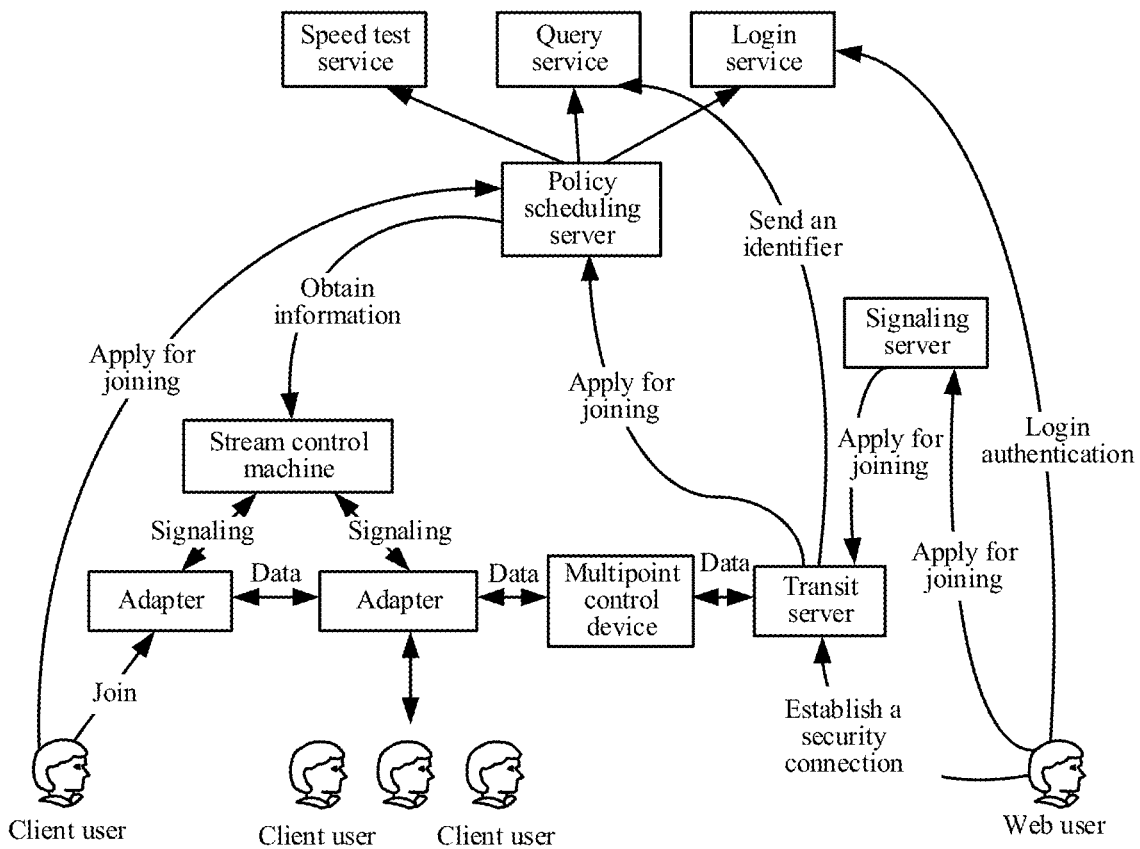
FIG. 2 is an architectural diagram of a network live streaming system according to an embodiment of the disclosure.

The method for managing network live streaming data provided in the embodiments of the disclosure is applicable to a framework of a data management procedure shown in FIG. 2. FIG. 2 is an architectural diagram of a network live streaming system according to an embodiment of the disclosure. The following describes a related device in FIG. 2.

Adapter: An adapter is configured to forward audio/video data sent by a terminal device and signaling in an audio/video process.

Stream control machine: A stream control machine is configured to adjust each audio/video parameter and audio routing in an audio/video process in real time.

Configuration center: A configuration center includes location distribution and real-time load statuses of all machines, and may synchronize the location distribution and real-time load statuses of all machines to an information center.

Policy scheduling server: A policy scheduling server is responsible for services such as request authentication, signature encryption, and security confirmation. Nearby adapters and stream control machines are allocated according to user location information and machine location and load information, so that users of the same room and the same operator are gathered to the same adapter as much as possible.

Query service: A query service includes, but is not limited to, querying user data, a relationship chain, remarks, a group, a group relationship chain, information generated by a user, or the like.

Login service: A login service is a general account login component provided so that accounts quickly access audio/videos or an instant messaging cloud service.

Signaling server: A signaling server is mainly responsible for access and login of a web-side user, transparent transmission of signaling, allocation of a transit server, negotiation and delivery of an audio/video initial parameter, negotiation of a connection channel, and negotiation and delivery of a security parameter.

Transit server: Firstly, a transit server is configured to orient to a web user, simulate web page instant messaging, and establish a direct connection to the web, including establishment of an interactive connection, negotiation of a security protocol key of a data packet transfer layer, forwarding of audio/video data of a security real-time transfer protocol, and audio/video quality control based on real-time transport control protocol (RTCP). Secondly, a transit server is configured to orient to the adapter and simulate establishment of a connection between an SDK user and an existing interactive live streaming system, including entering a room, data transmission, and the like. Then, a transit server is configured to connect signaling of the web user and the SDK user such as room entry and exit and state notification, and then connect audio/video data transcoding and remuxing of the web user and the SDK user, to exchange for a unified identifier ID to be compatible with room management and an account system of interactive live streaming.

The method for managing network live streaming data provided in the embodiments of the disclosure relates to an interaction process including the adapter, the multipoint control device, and the transit server of the live streaming device, that is, the multipoint control device is added between the adapter and the transit server to manage media data in the network live streaming process.

It may be understood that the method provided in the disclosure may be writing of a program to be used as processing logic in a hardware system, and may also be used as a data management apparatus. The processing logic is implemented in an integration or external connection manner. In an example embodiment, in the apparatus for managing network live streaming data, the multipoint control device receives the stream pushing request transmitted by the data access device; determines the stream pushing parameter set based on the media content feature of the stream pushing data from multiple data sources in the data access device; then determines the target port according to the stream pushing parameter, where the target port may be adapted to the media content feature of the stream pushing data; further receives, through the target port, the stream pushing data transmitted by the data access device; and pushes the stream pushing data to the live streaming device, so that the live streaming device plays media content of the stream pushing data in a network live streaming process. In this way, a process of combining media content of multiple terminals and performing network live streaming is implemented. Since a target port is selected for media content from multiple data sources in the stream pushing process in the method, the media content from multiple data sources can be desirably combined and adapted to the live streaming device. This reduces a live streaming delay caused by network fluctuation, avoids stream pushing blocking of live streaming caused by an occasional situation, and improves stability of the network live streaming process.

Figure 3:
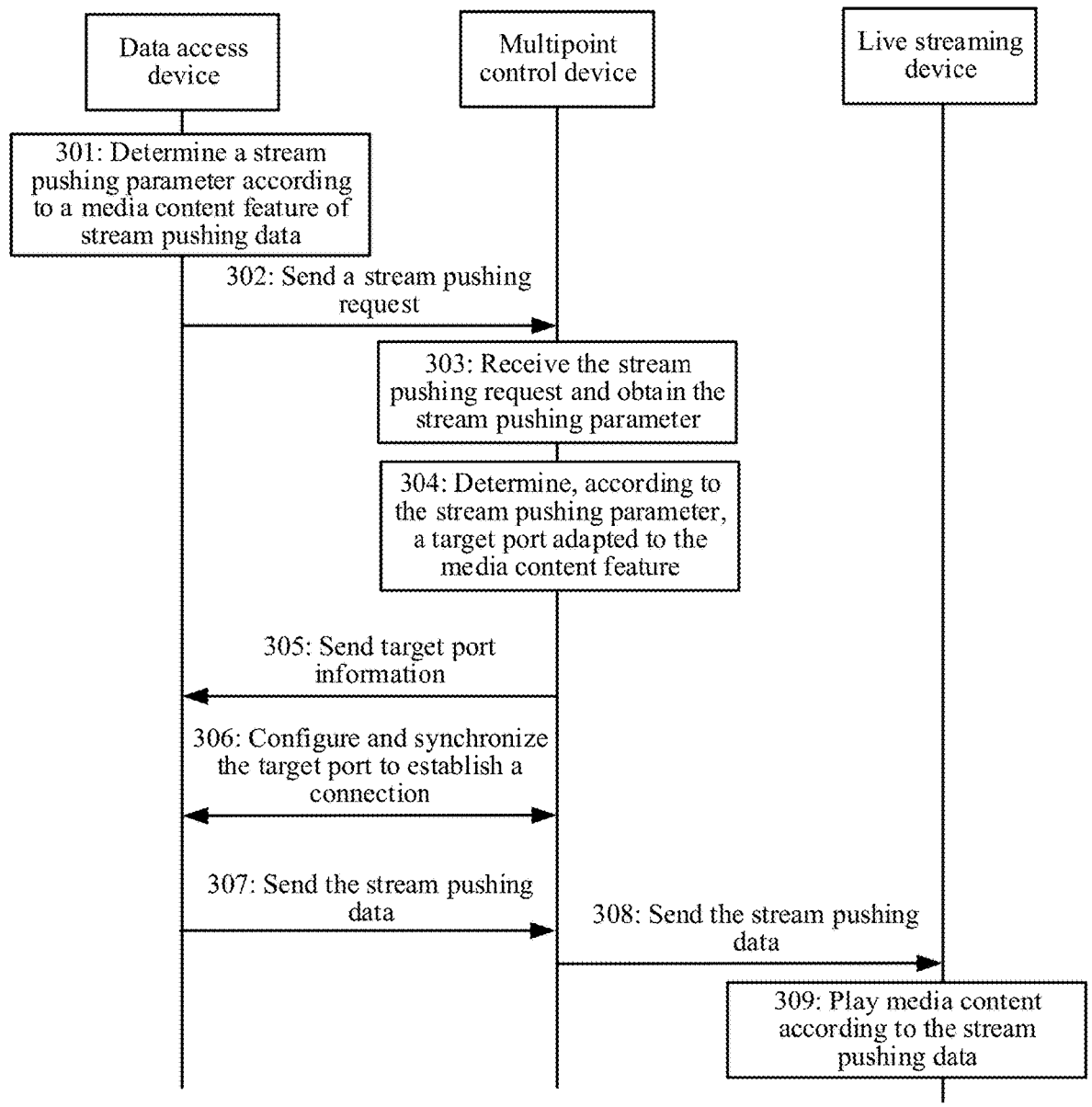
FIG. 3 is a flowchart of a method for managing network live streaming data according to an embodiment of the disclosure.

With reference to the architecture of the procedure, the method for managing network live streaming data in the embodiment is described below. FIG. 3 is a flowchart of a method for managing network live streaming data according to an embodiment of the disclosure. The method is applicable to a network live streaming system. The network live streaming system includes a data access device, a multipoint control device, and a live streaming device. This embodiment of the disclosure at least includes the following operations:

301: A data access device determines a stream pushing parameter according to a media content feature of stream pushing data.

In this embodiment, the stream pushing data includes media content data from at least two data sources. For example, the stream pushing data may be media content data of a video call of three persons. The stream pushing parameter is a parameter determined based on a feature of media content data, for example, a parameter such as an audio format, a number of channels, or an audio bit rate, or an encoding format, a resolution, or a bit rate of a video, or typesetting of multiple channels of images.

In addition, the data source may be a terminal device configured to upload media content data such as audio and a video in real time, for example, a mobile phone uploading a recorded video in real time. The data source may also be a platform that provides a data resource in a network, for example, multiple different websites providing video content. A specific form depends on an actual scenario.

It may be understood that, the specific stream pushing parameter may be a combination of one or more parameters in the foregoing example, and may be set according to an application scenario of the stream pushing data. For example, if the stream pushing data is audio content data of a multi-person audio call, the stream pushing parameter is an audio format, a number of channels, and an audio bit rate. A specific parameter form depends on an actual scenario and is not limited herein.

The stream pushing parameter is obtained, so that a parameter difference between media content from different data sources can be better understood, and then a port may be selected in a targeted manner, thereby ensuring that media content from multiple data sources is better combined in a network live streaming process.

In this embodiment, a process of determining the stream pushing parameter may be implemented based on an artificial intelligence model, that is, once the stream pushing data is accessed, each parameter of the stream pushing data may be extracted based on a preset analysis model. For example, assuming that a requirement of network live streaming is high sound quality, the stream pushing parameter obtained through analyzing based on the analysis model includes an audio format, a number of channels, and an audio bit rate. Besides, specific data is extracted.

302: The data access device sends a stream pushing request to a multipoint control device.

In this embodiment, the stream pushing request includes the stream pushing parameter.

303: The multipoint control device receives the stream pushing request and obtains the stream pushing parameter.

304: The multipoint control device determines, according to the stream pushing parameter, a target port adapted to the media content feature.

In this embodiment, the multipoint control device may allocate a data adaptation device, an audio processing device, a video processing device, and a stream pushing device according to global load information and request source location information, and send a port allocation request to these devices. The data adaptation device, the audio processing device, the video processing device, and the stream pushing device establish a session locally and allocate a target port.

The multipoint control device may be associated with multiple data adaptation devices, audio processing devices, video processing devices, and stream pushing devices in a network live streaming system. Before determining the target port, the multipoint control device collects load statuses of the associated devices, where the load statuses may specifically include CPU usage, a number of CPU cores, incoming traffic, outgoing traffic, a number of incoming streams, a number of outgoing streams, and the like, and then selects a corresponding device according to a preset condition. For example, the stream pushing parameter indicates that CPU usage of a required associated device is less than 50%. In this case, the multipoint control device may traverse to find a device whose CPU usage is less than 50% from associated devices, and determine an address and a corresponding port of the device.

It may be understood that, the associated device may also be a device integrated in the multipoint control device, and a specific form of the device depends on an actual scenario and is not limited herein.

The target port is determined in the foregoing manner, so that network fluency in a network live streaming process can be ensured. To be specific, a corresponding target port is selected according to media content parameters required by different terminals, and a process of combination and stream pushing of media content of multiple terminals is implemented based on the target port, which can ensure network fluency in the network live streaming process.

305: The multipoint control device sends target port information to the data access device.

In this embodiment, the multipoint control device determines, according to the target port determined in operation 304, a corresponding port identifier and device address information corresponding to the port, packages the information into the target port information and sends the target port information to the data access device.

306: The multipoint control device and the data access device synchronously configure the target port to establish a connection.

In this embodiment, a process of synchronously configuring the target port is a process of determining a corresponding device according to the device address information and selecting the port according to the port identifier. After the device and the port are determined, the connection may be established.

307: The data access device sends the stream pushing data to the multipoint control device.

In this embodiment, based on the port connection established in operation 306, the data access device sends the stream pushing data to the multipoint control device.

308: The multipoint control device sends the stream pushing data to a live streaming device.

In this embodiment, before the multipoint control device sends the stream pushing data to the live streaming device, a media content type, for example, audio or a video, of the stream pushing data may be further determined. Then, the stream pushing data is classified according to the media content type, to determine a type of the stream pushing data; and then, the stream pushing data is respectively converted into a target format corresponding to the type and is pushed to the live streaming device. For example, target formats require that an audio data format is MP3 and a video data format is FLV, and after the stream pushing data is classified into audio data and video data, the audio data and the video data are converted into the target formats.

It may be understood that, the process of classifying the media content may be performed based on voice recognition, that is, the audio part in the stream pushing data may be automatically recognized, and the audio is converted into a corresponding format, thereby ensuring that the stream pushing process is performed in a targeted manner.

309: The live streaming device plays media content according to the stream pushing data.

In this embodiment, the stream pushing data pushed to the live streaming device combines media content data from at least two data sources, where the media content data may be juxtaposed or stacked. Further, in response to an operation triggered by the user on a playing page associated with the live streaming device, media content may be switched correspondingly. For example, the live streaming device is associated with an H5 page, and the live streaming device may play corresponding media content according to media content selection of the user on the H5 page.

As can be seen from the above embodiment, the multipoint control device receives the stream pushing request transmitted by the data access device; determines the stream pushing parameter set based on the media content feature of the stream pushing data from multiple data sources in the data access device; then determines the target port according to the stream pushing parameter, where the target port may be adapted to the media content feature of the stream pushing data; further receives, through the target port, the stream pushing data transmitted by the data access device; and pushes the stream pushing data to the live streaming device, so that the live streaming device plays media content of the stream pushing data in a network live streaming process. In this way, a process of combining media content of multiple data sources and performing network live streaming is implemented. Since a target port is selected for media content from multiple data sources in the stream pushing process in the method, the media content from multiple data sources can be desirably combined and adapted to the live streaming device. This reduces a live streaming delay caused by network fluctuation, avoids stream pushing blocking of live streaming caused by an occasional situation, and improves stability of the network live streaming process.

Figure 4:
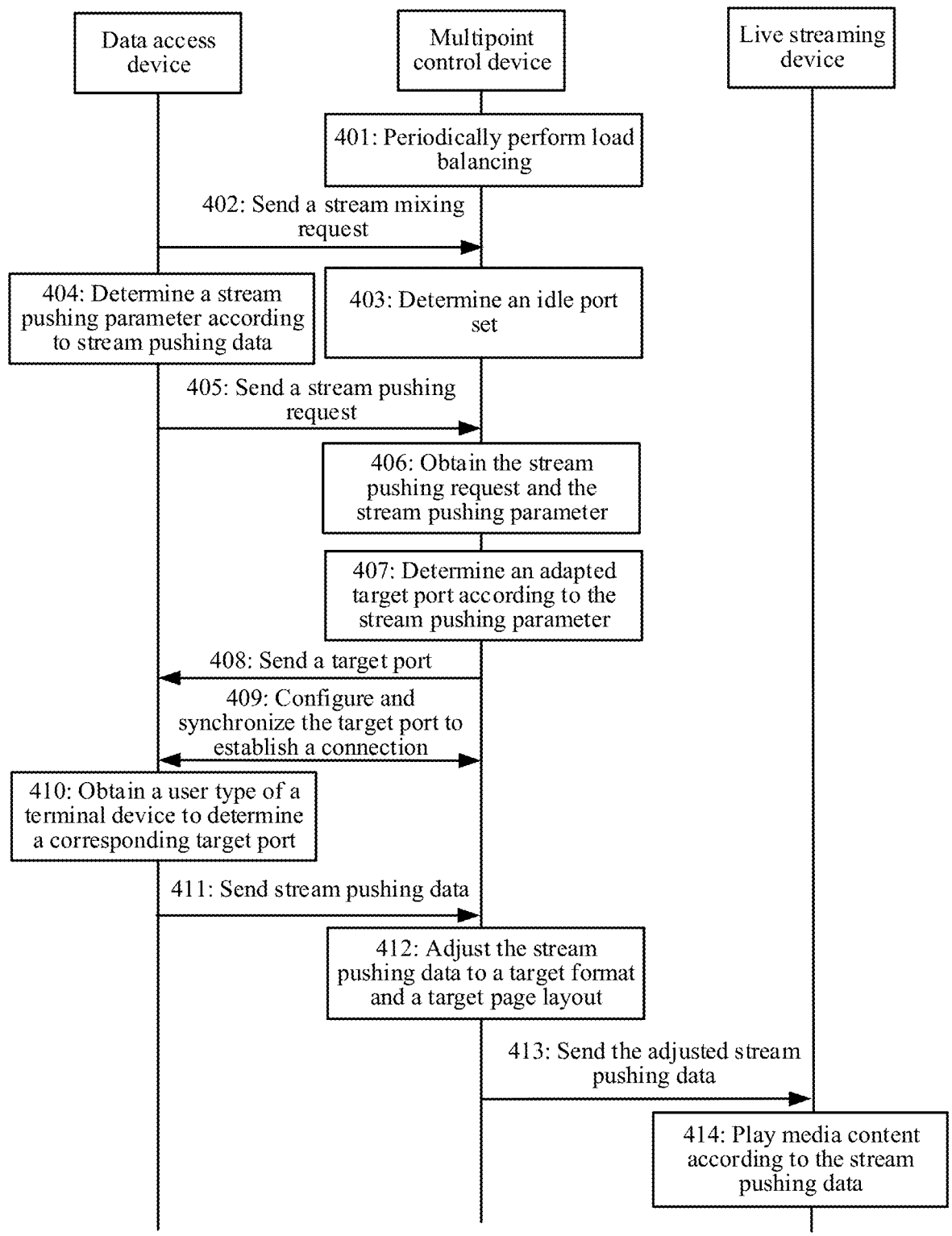
FIG. 4 is a flowchart of another method for managing network live streaming data according to an embodiment of the disclosure.

The foregoing embodiment describes the process for managing network live streaming data, and the following describes the process with reference to a specific scenario of a game application. FIG. 4 is a flowchart of another method for managing network live streaming data according to an embodiment of the disclosure. The method is applicable to a network live streaming system. The network live streaming system includes a data access device, a multipoint control device, and a live streaming device. This embodiment of the disclosure at least includes the following operations:

401: The multipoint control device periodically performs load balancing.

In this embodiment, the process of load balancing performed by the multipoint control device is obtaining load information of an associated device of the multipoint control device according to a preset period. The load information is used to indicate an exception of the associated device. If the load information does not satisfy a preset condition, the exception associated device is determined according to the load information; and then address switching is performed on the exception associated device, so that the load information of the associated device satisfies the preset condition.

For example, assuming that the preset condition is that a response delay between the multipoint control device and the associated device is less than 10 milliseconds, an associated device with a response delay that is less than 10 milliseconds needs to be detected.

It may be understood that the associated device may be a device that is associated with the multipoint control device through a network and that may implement a corresponding function. The associated device may also be multiple devices integrated in the multipoint control device locally. A specific association form depends on an actual scenario.

402: The data access device sends a stream mixing request to the multipoint control device.

In this embodiment, because media content in network live streaming is generally content combining a video and audio, to ensure a correspondence between the video and the audio, a stream mixing process needs to be performed.

403: The multipoint control device determines an idle port set.

In this embodiment, the idle port set of the multipoint control device may be determined in a stream mixing process, that is, an available associated device and an available port of an associated device.

404: The data access device determines a stream pushing parameter according to stream pushing data.

405: The data access device sends a stream pushing request to the multipoint control device.

In this embodiment, in a process of sending the stream pushing request, a session of the stream mixing process may be reused. In addition, if the user requires both stream mixing and stream pushing, the two requests may be combined into one request.

406: The multipoint control device receives the stream pushing request and obtains the stream pushing parameter.

407: The multipoint control device determines an adapted target port according to the stream pushing parameter.

In this embodiment, the target port may be selected based on an idle port set determined in the stream mixing process, thereby reducing the range of determining the port and improving the efficiency of determining the target port.

408: The multipoint control device sends target port information to the data access device.

409: The multipoint control device and the data access device synchronize the target port to establish a connection.

410: The data access device obtains a user type of a data source to determine a corresponding target port.

411: The data access device sends the stream pushing data to the multipoint control device.

In this embodiment, operation 408 to operation 411 are similar to operation 305 to operation 308 in the embodiment in FIG. 3. For a related feature, refer to the foregoing embodiment and details are not repeated herein.

412: The multipoint control device adjusts the stream pushing data to a target format and a target page layout.

In this embodiment, the target format and the target page layout may be transmitted by the live streaming device, or may be recorded in a history data processing record of the multipoint control device. If the target format and the target page layout are transmitted by the live streaming device, the multipoint control device needs to receive a target parameter transmitted by the live streaming device. The target parameter is determined based on a media content feature in the network live streaming process, and then the stream pushing data is adjusted according to the target parameter.

The target format and the target page layout may also be set by a terminal device associated with the data access device. Specifically, the multipoint control device may receive a page layout parameter transmitted by the data access device. The page layout parameter is used to indicate a page distribution status of media content data from at least two data sources in the data access device. Then, the stream pushing data is adjusted according to the page layout parameter, for example, a page layout form such as picture-in-picture, four-box grid, and nine-box grid. Thus, media content data from multiple data sources can be flexibly combined, improving richness of network live streaming.

It may be understood that, the target parameter may target audio, a video, or a combination of audio and a video. For example, in a voice live streaming scenario, the target parameter may be information in an audio format. In a remote desktop scenario including only a video, the target parameter may be information in a video format. In the network live streaming scenario, the target parameter may include the information in an audio format and the information in a video format. The target parameter is set in a targeted manner, so that a live streaming process can be performed normally in different scenarios.

In addition, the page layout parameter may target audio, a video, or a combination of audio and a video, for example, to implement audio mixing of audio and an effect such as "picture-in-picture" of a video, thereby improving flexibility of a live streaming process.

In another possible scenario, a target object of the target parameter or the page layout parameter may also be obtained through analysis based on the artificial intelligence technology. For example, the network live streaming system may automatically analyze a type of the stream pushing data, and when determining that the stream pushing data is audio data, may automatically extract a part corresponding to audio in the target parameter and perform related setting.

413: The multipoint control device sends the adjusted stream pushing data to the live streaming device.

In this embodiment, to ensure the confidentiality of the stream pushing process, the stream pushing data may be encrypted, where an encryption process may be performed based on a target key transmitted by a policy scheduling device, and the target key is used to indicate an address of the live streaming device. The target key is set for the stream pushing data, and then the stream pushing data is encrypted according to the target key.

414: The live streaming device plays the media content according to the stream pushing data.

As can be seen from the foregoing embodiment, based on a real-time audio/video engine (RTC) based on a selective forwarding unit (SFU) solution of a server, in the method for managing network live streaming data provided in the disclosure, the multipoint control device may push a real time messaging protocol (RTMP) stream or an HTTP live streaming (HLS) stream to a live streaming system, thereby implementing simultaneous live streaming in a real-time multi-person call process. Further, based on optimization of configuration of a related port and optimization of selection of an associated device, live streaming with a lower delay may be implemented. According to statistics collection, stream pushing and viewing in formats such as rtmp and hls may implement a delay of 1 to 3 seconds and viewing on an H5 page may implement a delay of 0.5 to 1 second. Because of the adaptability of the multipoint control device to the stream pushing process, better live streaming experience may be obtained in a weak network scenario, a resolution, a bit rate, a frame rate, and a screen layout may be flexibly customized, and the richness of live streaming content is improved.

Figure 5:
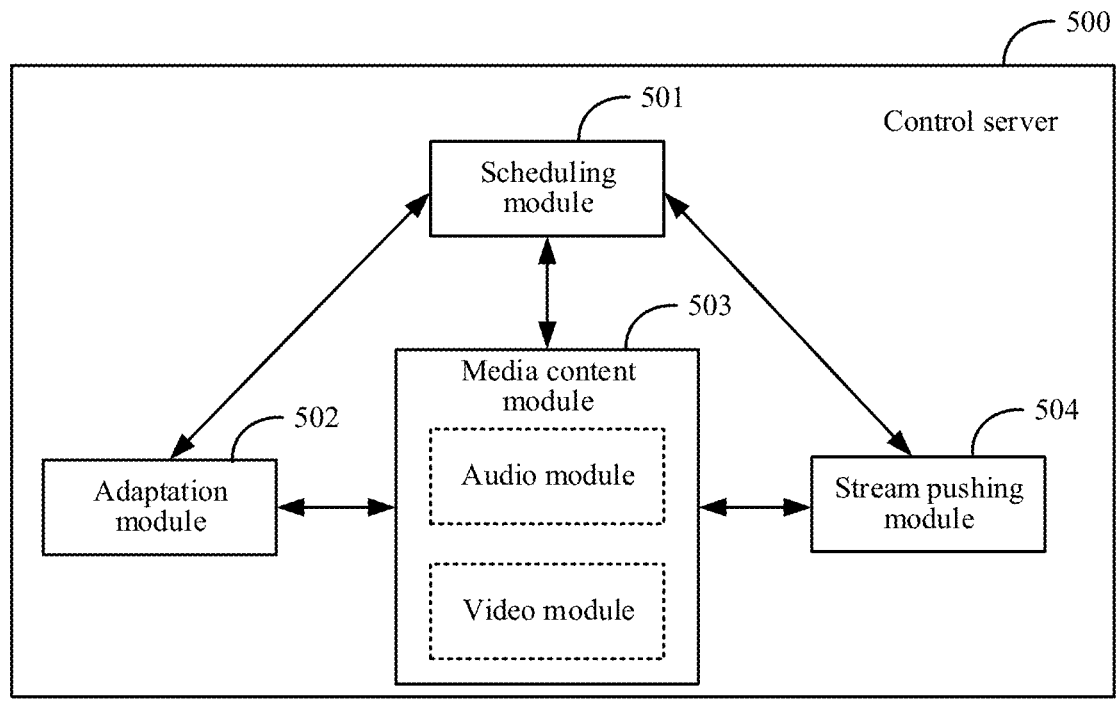
FIG. 5 is a schematic structural diagram of a control server according to an embodiment of the disclosure.

To better implement the foregoing solution of the embodiments of the disclosure, a managing network live streaming data apparatus is further described below. FIG. 5 is a schematic structural diagram of a control server according to an embodiment of the disclosure. The control server is equivalent to the multipoint control device in the foregoing embodiment, and the control server 500 includes:

a scheduling module 501, configured to receive a stream pushing request transmitted by a data access device, the stream pushing request including a stream pushing parameter, the stream pushing parameter being determined by the data access device based on a media content feature of to-be-transmitted stream pushing data, the stream pushing data including media content data from at least two data sources;

an adaptation module 502, configured to determine, according to the stream pushing parameter, a target port adapted to the media content feature;

a media content module 503, configured to receive, through the target port, the stream pushing data transmitted by the data access device; and a stream pushing module 504, configured to push the stream pushing data to a live streaming device, so that the live streaming device plays the media content data in a network live streaming process.

In some possible embodiments of the disclosure, the scheduling module 501 is further configured to obtain load information of an associated device of the multipoint control device according to a preset period, the load information being used to indicate an exception of the associated device.

The scheduling module 501 is further configured to determine address information of the exception associated device according to the load information in a case that the load information does not satisfy a preset condition, the preset condition being determined based on a connection status between the associated device and the multipoint control device and a load status of the associated device.

The scheduling module 501 is further configured to perform address switching for the associated device according to the address information, so that the load information of the associated device satisfies the preset condition.

In some possible embodiments of the disclosure, the adaptation module 502 may be specifically configured to receive a stream mixing request transmitted by the data access device.

The adaptation module 502 is specifically configured to determine an idle port set according to the stream mixing request.

The adaptation module 502 is specifically configured to select the target port from the idle port set according to the stream pushing parameter.

In some possible embodiments of the disclosure, the stream pushing module 504 is specifically configured to determine a media content type of the stream pushing data.

The stream pushing module 504 is specifically configured to classify the stream pushing data according to the media content type, to determine a type of the stream pushing data.

The stream pushing module 504 is specifically configured to convert the stream pushing data into a target format corresponding to the type, and push the stream pushing data to the live streaming device.

In some possible embodiments of the disclosure, the scheduling module 501 is further configured to receive a target parameter transmitted by the live streaming device, the target parameter being determined based on the media content feature in the network live streaming process.

The media content module 503 is further configured to adjust the stream pushing data according to the target parameter.

In some possible embodiments of the disclosure, the scheduling module 501 is further configured to receive a page layout parameter transmitted by the data access device, the page layout parameter being used to indicate a page distribution status of the media content data from the at least two data sources in the data access device.

The media content module 503 is further configured to adjust the stream pushing data according to the page layout parameter.

In some possible embodiments of the disclosure, the network live streaming system may further include a policy scheduling device, and the scheduling module 501 is further configured to obtain a target key transmitted by a policy scheduling device, the target key being used to indicate an address of the live streaming device.

The stream pushing module 504 is further configured to encrypt the stream pushing data according to the target key.

The multipoint control device receives the stream pushing request transmitted by the data access device; determines the stream pushing parameter set based on the media content feature of the stream pushing data from multiple data sources in the data access device; then determines the target port according to the stream pushing parameter, where the target port may be adapted to the media content feature; further receives, through the target port, the stream pushing data transmitted by the data access device; and pushes the stream pushing data to the live streaming device, so that the live streaming device plays media content data of the stream pushing data in a network live streaming process. In this way, a process of combining media content of multiple data sources and performing network live streaming is implemented. Since a target port is selected for media content from multiple data sources in the stream pushing process in the method, the media content from multiple data sources can be desirably combined and adapted to the live streaming device. This reduces a live streaming delay caused by network fluctuation, avoids stream pushing blocking of live streaming caused by an occasional situation, and improves stability of the network live streaming process.

Figure 6:
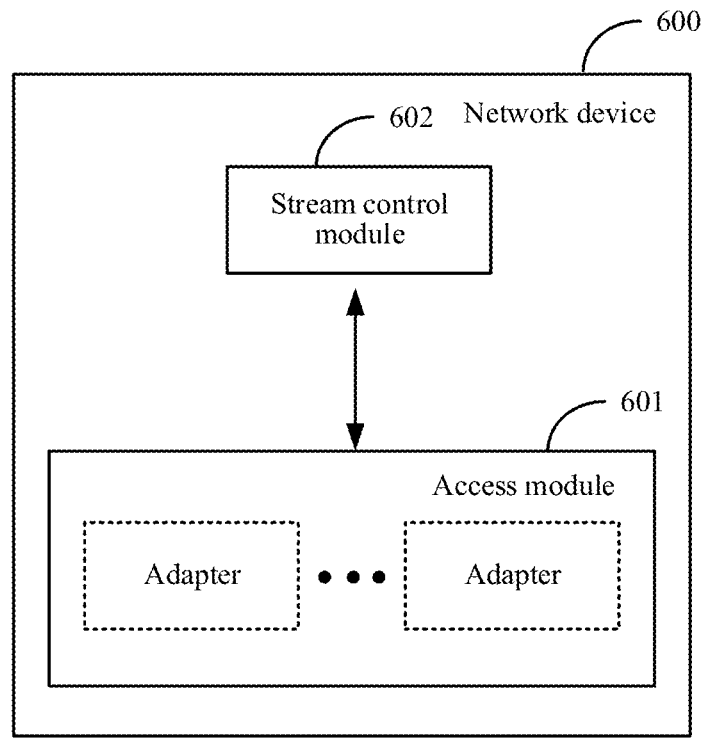
FIG. 6 is a schematic structural diagram of a network device according to an embodiment of the disclosure.

The disclosure further provides a network device, that is, the data access device in the foregoing embodiment, which is applicable to a network live streaming system. FIG. 6 is a schematic structural diagram of a network device according to an embodiment of the disclosure. The network device 600 specifically includes:

an access module 601, configured to receive stream pushing data transmitted by at least two data sources; and a stream control module 602, configured to determine a stream pushing parameter according to a media content feature of the stream pushing data, the stream control module 602 being further configured to transmit the stream pushing parameter to a multipoint control device, the stream pushing parameter being used to instruct the multipoint control device to determine a target port adapted to the media content feature;

the stream control module 602 being further configured to receive information of the target port that is transmitted by the multipoint control device; and the access module 601 being further configured to transmit the stream pushing data through the target port.

In some possible embodiments of the disclosure, the stream control module 602 may be further configured to transmit a stream mixing request to the multipoint control device according to the stream pushing data, the stream mixing request being used to instruct the multipoint control device to determine an idle port set.

The stream control module 602 is further configured to receive an idle port set transmitted by the multipoint control device.

The access module 601 is further configured to perform port synchronization according to the idle port set.

In some possible embodiments of the disclosure, the access module 601 may be further configured to obtain a user type of the data source.

The access module 601 is further configured to determine, according to the user type, a data source accessing the target port.

In some possible embodiments of the disclosure, the access module 601 may be further configured to obtain a page layout parameter transmitted by the data source.

The access module 601 is further configured to transmit the page layout parameter to the multipoint control device, so that the multipoint control device adjusts the stream pushing data according to the page layout parameter.

Figure 7:
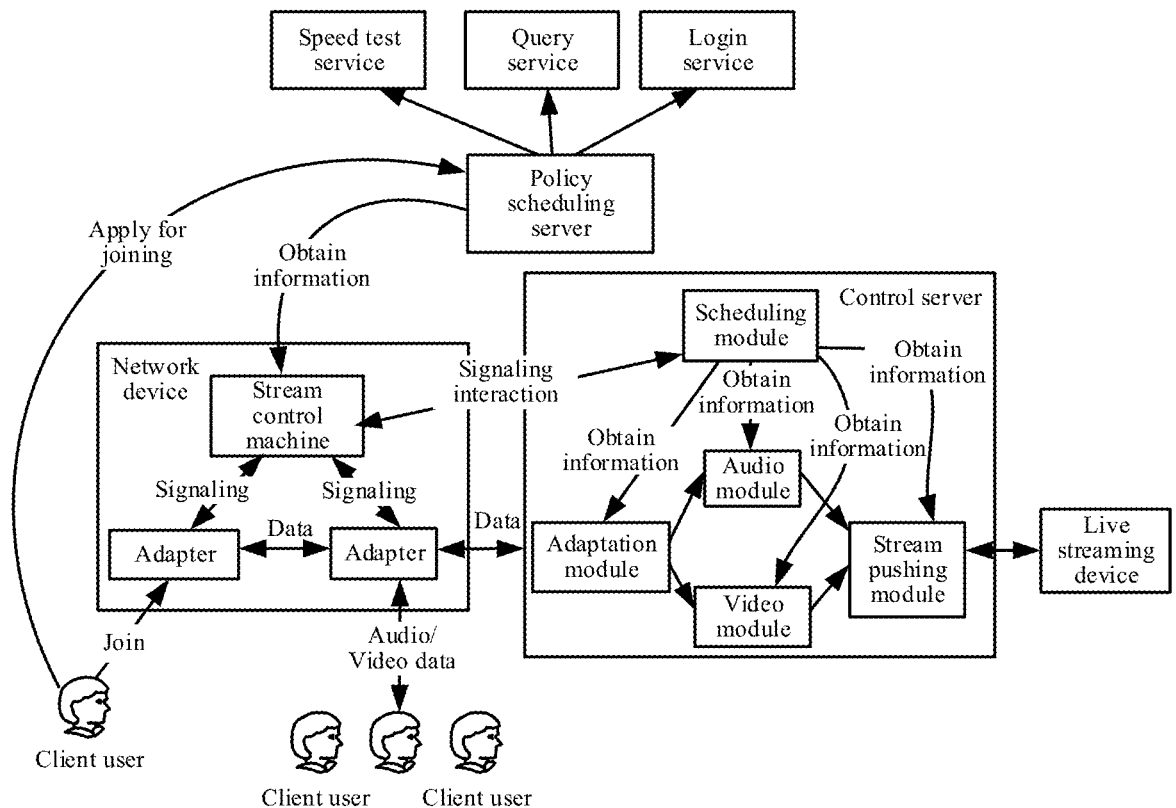
FIG. 7 is a framework diagram of another network live streaming system according to an embodiment of the disclosure.

The foregoing embodiments describe the functional composition of the network device and the control server. The following describes interaction of each functional module in the network device and the control server with reference to a specific framework of a network live streaming system. FIG. 7 is a framework diagram of another network live streaming system according to an embodiment of the disclosure. Compared with the framework of the network live streaming system shown in FIG. 2, the multipoint control device in FIG. 2 is further divided into a scheduling module, an adaptation module, an audio module, a video module, and a stream pushing module.

Specifically, in the framework of the system shown in FIG. 7, the scheduling module periodically collects load information, geographical location information, and a machine live/dead state of the adaptation module, the audio module, the video module, and the stream pushing module, guides load allocation of these modules according to the collected information and dynamically switches a machine in a crash. The scheduling module receives a request transmitted by the stream control module to apply for stream mixing or stream pushing, allocates, according to geographical location information in the request, a nearby execution device corresponding to each of the adaptation module, the audio module, the video module, and the stream pushing module based on load balancing, and returns a result to the stream control module after requesting the execution device to allocate a port.

The adaptation module is specifically configured to regularly report load information to the scheduling module. After receiving an allocation request from the scheduling module, the adaptation module allocates a port and establishes a session locally, then receives data sent by an adapter, and processes the data and distributes the processed data to the back-end audio module and video module.

The audio module is specifically configured to: select a path for multiple channels of audio, perform audio mixing according to a requirement of a live streaming party, and transcode the audio into an audio format required by the live streaming party.

The video module is specifically configured to: perform routing and typesetting according to a requirement of the live streaming party, and transcode data to a corresponding video format, resolution, frame rate, and code rate according to a requirement of the live streaming party.

The stream pushing module is specifically configured to: encapsulate audio/video data processed by the audio module and the video module into an rtmp stream, and push the rtmp stream to a live streaming system.

Figure 8:
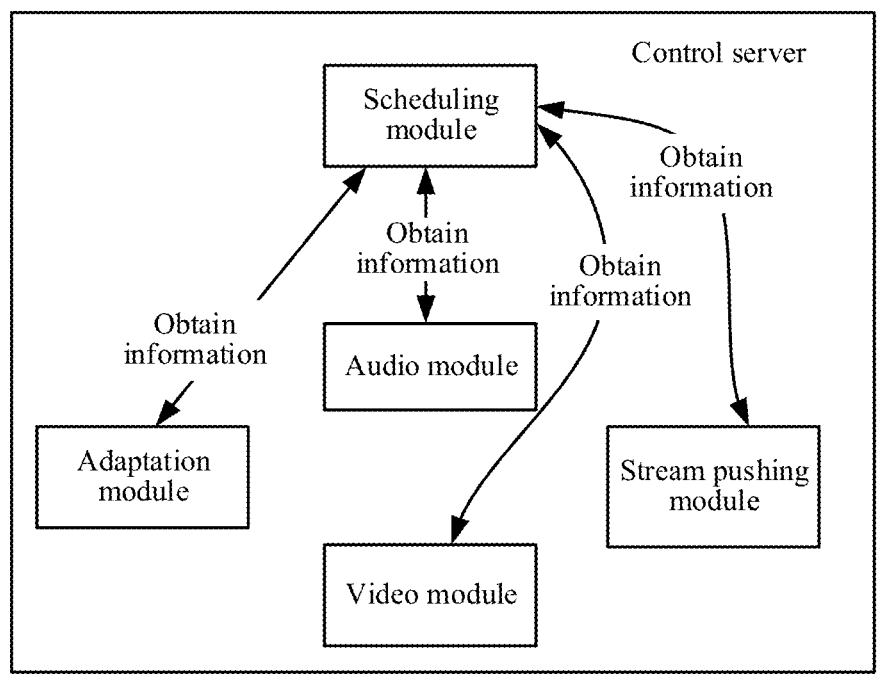
FIG. 8 is a schematic diagram of interaction of load balancing according to an embodiment of the disclosure.

The following describes an interaction process of a corresponding module of the method for managing network live streaming data in FIG. 3 or FIG. 4 with reference to the framework of the network live streaming system in FIG. 7. FIG. 8 is a schematic diagram of interaction of load balancing according to an embodiment of the disclosure. Specifically, the adaptation module, the audio module, the video module, and the stream pushing module periodically report load information to the scheduling module, for example, upload the load information every second. The load information includes: CPU usage, a number of CPU cores, incoming traffic, outgoing traffic, a number of incoming streams, and a number of outgoing streams. Then, the scheduling module receives load information of the four modules and configured geographic location information of each machine, to master a global load status of each module in each region in real time.

Further, the adaptation module, the audio module, the video module, and the stream pushing module may further detect a connection/disconnection status of an upstream/downstream module; and if disconnection is detected, report the disconnection to the scheduling module. The scheduling module guides switching to an appropriate device according to a machine live/dead state and a load status.

Figure 9:
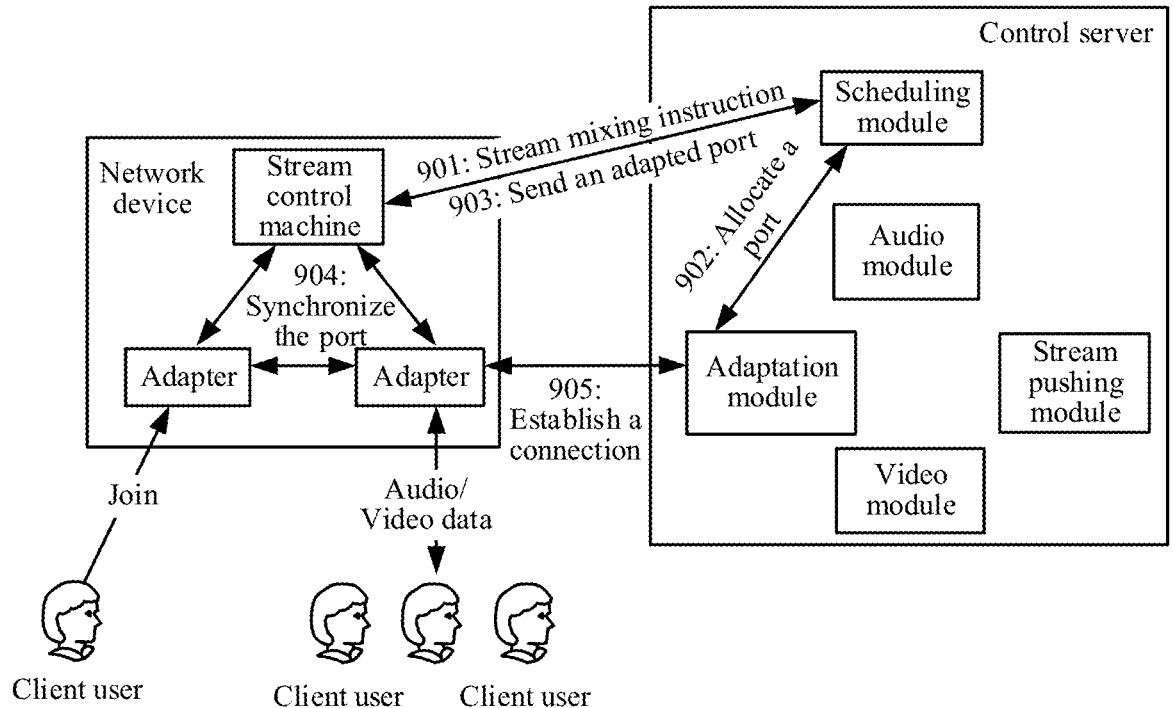
FIG. 9 is a schematic interaction diagram of stream pushing of media content of multiple terminals according to an embodiment of the disclosure.

In addition, FIG. 9 shows a stream mixing process of stream pushing data. FIG. 9 is a schematic interaction diagram of stream pushing of media content of multiple terminals according to an embodiment of the disclosure. The following operations are included:

901: A stream control machine sends a stream mixing instruction to a scheduling module.

902: The scheduling module allocates a port, that is, the scheduling module allocates a data adaptation device according to global load information and request source location information and sends a port allocation request to the data adaptation device, and the data adaptation device establishes a session of a user locally, allocates an idle port, and returns a result to the scheduling module.

903: The scheduling module returns port information of an allocated adaptation module and IP information of the device to a stream control machine.

904: The stream control machine synchronizes the port information sent by the adaptation module and the IP information of the device to an adapter.

905: After obtaining the port information of the adaptation module and the IP information of the device, the adapter establishes a connection to the adapted module and sends data.

Figure 10:
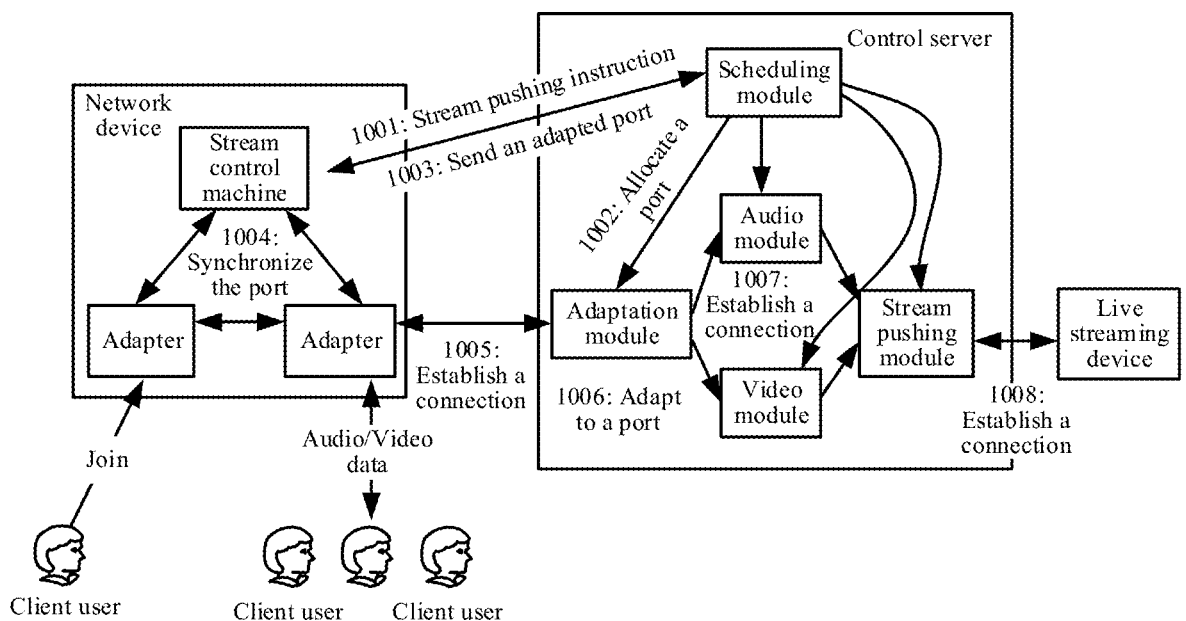
FIG. 10 is a schematic interaction diagram of stream pushing of media content of multiple terminals according to an embodiment of the disclosure.

In addition, in a stream pushing process, a specific module interaction process is shown in FIG. 10. FIG. 10 is a schematic interaction diagram of stream pushing of media content of multiple terminals according to an embodiment of the disclosure. The following operations are included:

1001: A stream control machine sends a stream pushing instruction to a scheduling module, and writes a corresponding stream pushing parameter, such as an audio format of audio, a number of channels, or an audio code rate, or an encoding format, a resolution, or a bit rate of a video, and typesetting of multiple channels of images.

1002: The scheduling module allocates a data adaptation machine, an audio processing machine, a video processing machine, and a stream pushing machine according to global load information and request source location information, and sends a port allocation request to these machines; and the data adaptation machine, the audio processing machine, the video processing machine, and the stream pushing machine establish a session of a user locally, allocate an idle port, and return a result to the scheduling module.

It may be understood that, if the user already has a session of uplink stream mixing on the adaptation module, the session of uplink stream mixing is reused herein. In addition, if the user requires both stream mixing and stream pushing, the two requests may be combined into one request. The audio processing module and the video module store related audio/video parameters while establishing a local session.

1003: The scheduling module returns port information of an allocated data adaptation module and IP information of the device to a stream control machine.

1004: The stream control machine synchronizes the port information of the adaptation module and the IP information of the device to an adapter.

In this embodiment, the figure shows two adapters. In an actual scenario, there may be more or fewer adapters. Specifically, a number of adapters may be set with reference to a number of terminal devices associated with a network device, or may be determined according to a user type corresponding to the terminal device. A specific setting rule depends on an actual scenario and is not limited herein.

1005: After obtaining the port information of the adaptation module and the IP information of the device, the adapter establishes a connection to the adapted module and sends data.

1006: The scheduling module synchronizes port information of an allocated audio processing module and video processing module and the IP information of the device to the adaptation module, and synchronizes port information of the stream pushing module and the IP information of the device to the audio processing module and the video module.

1007: After obtaining the port information for audio processing and video processing and the IP information of the device, the adaptation module establishes a connection to an audio processing device and a video processing device and sends audio/video data.

1008: The stream pushing module establishes a connection to the live streaming device, and after receiving data of the audio module and the video module, pushes rtmp data to the live streaming system.

It may be understood that, the adaptation module may support the standard rtp protocol, and may also support various private audio/video transfer protocols. A stream format of stream pushing of an MCU in a server is not limited to rtmp and HLS.

Figure 11:
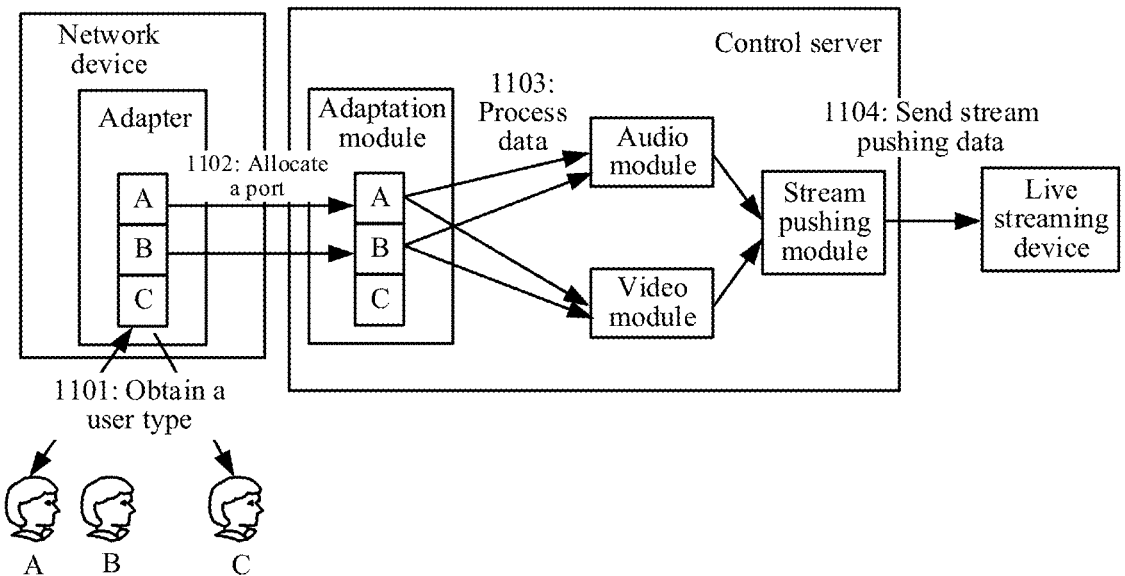
FIG. 11 is another schematic interaction diagram of stream pushing of media content of multiple terminals according to an embodiment of the disclosure.

In consideration that the terminal device associated with the network device may be a host or an audience and a host needs to push data and an audience does not need to push data, FIG. 11 is another schematic interaction diagram of stream pushing of media content of multiple terminals according to an embodiment of the disclosure. In FIG. 11, a 3-person real-time audio/video call room is used as an example to describe an uplink data processing process. A corresponding adapter has three user ports: A, B, and C. A and B have uplink data, that is, are hosts. C is an audience user and does not need to push data. That is, the process includes:

1101: An adapter obtains a user type.

1102: The adapter allocates a port according to the user type to establish a connection to an adaptation module.

1103: After receiving uplink audio/video data sent by A and B, the adaptation module sorts data packets and performs packet loss recovery, transfers decoded audio frames to the audio module one by one, attaches audio parameters such as an audio format and a number of channels, transfers decoded video frames to the video module one by one, and attaches video parameters such as an encoding format and a resolution. The adaptation module needs to receive and process data of different protocols, such as data of the standard rtp or audio/video data of private udp. After receiving the audio data, the audio module performs audio mixing and transcoding processing according to a stored stream pushing parameter, and then sends the audio data to the stream pushing module. After receiving the video data, the video module performs screen layout arrangement according to the stored stream pushing parameter, performs stream mixing processing according to a resolution, a code rate, and a frame rate required in live streaming, and then sends the video data to the stream pushing module.

1104: The stream pushing module encapsulates audio/video data into an rtmp format after receiving the audio/video data, and pushes the audio/video data to a live streaming system.

As can be seen from the foregoing embodiment, the method for managing network live streaming data provided in the disclosure may push products of a real-time multi-person audio/video call to the live streaming system at the same time, to provide a live streaming service. In addition, in a live streaming service, a client of a real-time multi-person call may also be configured to capture and push streams of live streaming, to obtain a lower stream pushing delay and a better stream pushing effect of a weak network. A resolution, a bit rate, a frame rate, and a screen layout can be flexibly customized in stream pushing.

Figure 12:
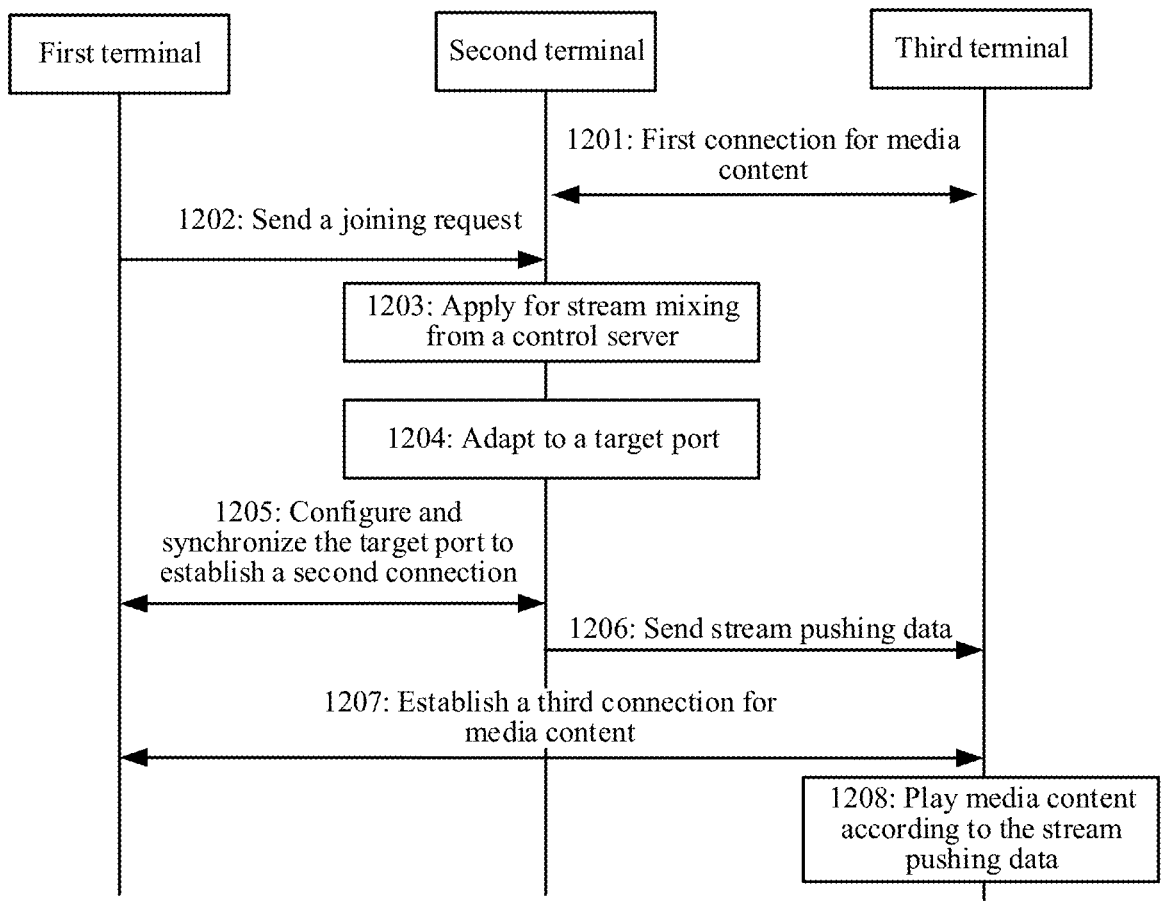
FIG. 12 is a flowchart of another method for managing network live streaming data according to an embodiment of the disclosure.

The method and the apparatus in the foregoing embodiments are specifically applicable to a network live streaming scenario of combination of media content of multiple terminals. In the scenario, a user may flexibly join an interaction process of the media content of the multiple terminals, for example, a process of a multi-person video call. Then, video call content is pushed to the network live streaming system, so that media content in the network live streaming process is updated. FIG. 12 is a flowchart of another method for managing network live streaming data according to an embodiment of the disclosure. In FIG. 12, a first terminal is a data source that prepares to join a live streaming room and pushes media content. Media content of a second terminal in the live streaming room is being pushed to the third terminal for playback. The first terminal and the second terminal may generate media content of network live streaming through a client SDK, and the third terminal may watch network live streaming through an H5 page. Specifically, the process includes the following operations:

1201: The second terminal and the third terminal establish a first connection for media content.

In this embodiment, the first connection established by the second terminal and the third terminal indicates that the third terminal is playing the media content pushed by the second terminal.

1202: The first terminal sends a joining request to the second terminal.

In this embodiment, the joining request transmitted by the first terminal to the second terminal may include a stream pushing parameter of the first terminal, that is, a feature parameter of media content generated by the first terminal, for example, a screen resolution, a bit rate, a frame rate, and a screen layout.

1203: The second terminal applies for stream mixing from a control server.

1204: The second terminal determines an adapted target port.

1205: The second terminal and the first terminal perform configuration and synchronize the target port to establish a second connection.

1206: The second terminal sends stream pushing data to the third terminal.

1207: The first terminal, the second terminal, and the third terminal establish a third connection for media content.

In this embodiment, the content in operation 1203 to operation 1207 is similar to that in operation 404 to operation 413 in the embodiment in FIG. 4. For a related feature, refer to the foregoing embodiment and details are not repeated herein.

1208: The third terminal plays the media content according to the stream pushing data.

Figure 13:
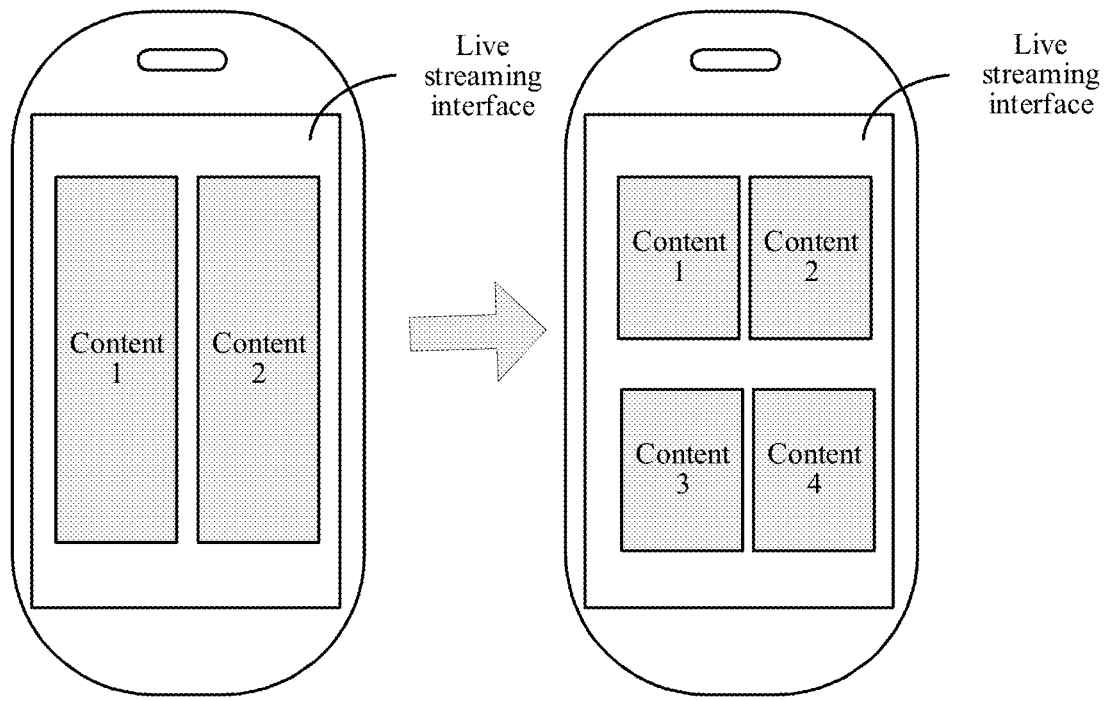
FIG. 13 is a schematic diagram of update of a network live streaming page according to an embodiment of the disclosure.

In a possible scenario, a change of a page of the third terminal is shown in FIG. 13. FIG. 13 is a schematic diagram of update of a network live streaming page according to an embodiment of the disclosure. The left side of FIG. 13 shows a live streaming interface when the third terminal establishes the first connection to the second terminal. After the media content of the first terminal is added in this embodiment, because stream pushing data includes a page layout parameter, the live streaming interface may be rearranged, that is, a live streaming interface shown on the right side of FIG. 13 is obtained. Therefore, this implements a process of combining media content of multiple terminals and stream pushing to the live streaming system for playback, improves the richness of media content of the live streaming page, and has good stability when media content is added.

Figure 14:
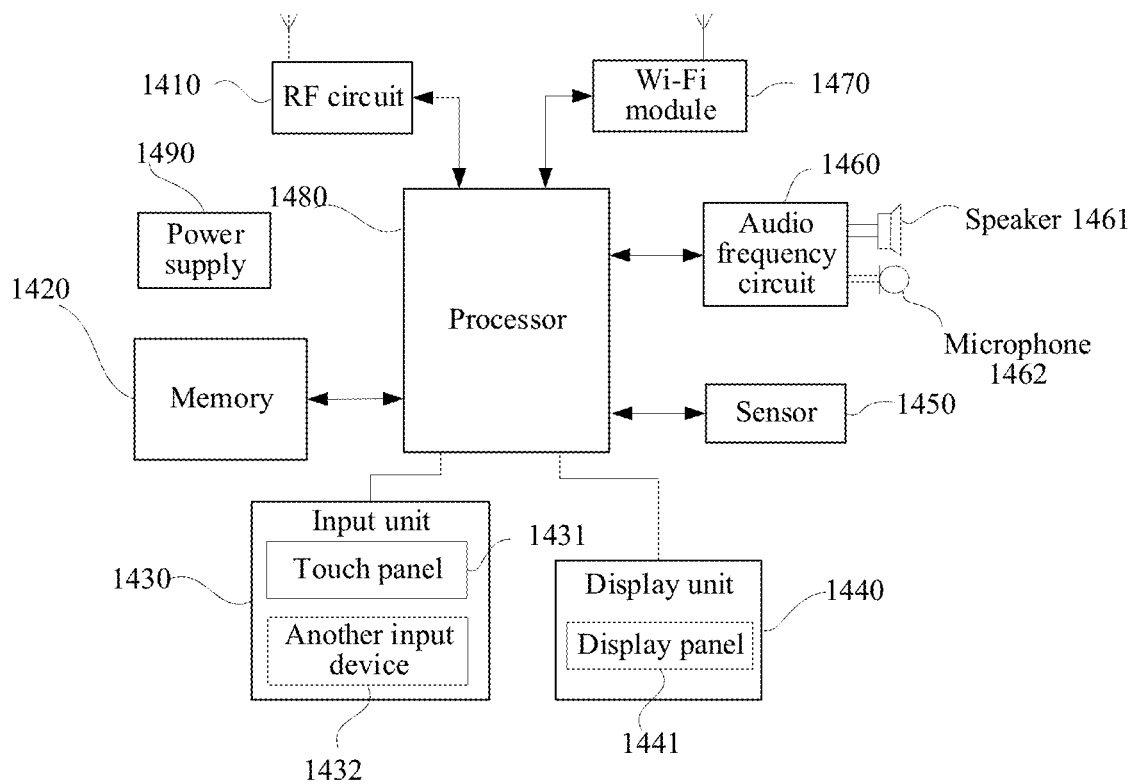
FIG. 14 is a schematic structural diagram of another terminal device according to an embodiment of the disclosure.

An embodiment of the disclosure further provides a terminal device. FIG. 14 is a schematic structural diagram of another terminal device according to an embodiment of the disclosure. For ease of description, only a part related to this embodiment of the disclosure is shown. For a specific technical detail not disclosed, refer to the method part in the embodiments of the disclosure. The terminal may be any terminal device including a mobile phone, a tablet computer, a personal digital assistant (PDA), a point of sales (POS), and an in-vehicle computer, and the terminal device being a mobile phone is used as an example.

FIG. 14 is a block diagram of a part of a structure of a mobile phone related to a terminal according to an embodiment of the disclosure. Referring to FIG. 14, the mobile phone includes components such as a radio frequency (RF) circuit 1410, a memory 1420, an input unit 1430, a display unit 1440, a sensor 1450, an audio circuit 1460, a wireless fidelity (Wi-Fi) module 1470, a processor 1480, and a power supply 1490. Persons skilled in the art may understand that the structure of the mobile phone shown in FIG. 14 does not constitute a limitation on the mobile phone, and the mobile phone may include more or fewer components than those shown in the figure, or some components may be combined, or a different component deployment may be used.

The following describes the components of the mobile phone with reference to FIG. 14 in detail.

The RF circuit 1410 may be configured to receive and transmit a signal in an information receiving and transmission process or a call process, and in particular, after receiving downlink information of a base station, transmit the downlink information to the processor 1480 for processing. In addition, the RF circuit transmits uplink data to the base station. Generally, the RF circuit 1410 includes, but not limited to, an antenna, at least one amplifier, a transceiver, a coupler, a low noise amplifier (LNA), and a duplexer. In addition, the RF circuit 1410 may also communicate with a network and another device by means of wireless communication. The wireless communication may use any communication standard or protocol, including, but not limited to, Global system for mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1420 may be configured to store a software program and a module. The processor 1480 runs the software program and the module that are stored in the memory 1420, to perform various functional applications and data processing of the mobile phone. The memory 1420 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 1420 may include a high speed random access memory, and may also include a non-volatile memory, such as at least one magnetic disk storage device, a flash memory, or another volatile solid-state storage device.

The input unit 1430 may be configured to receive inputted digit or character information, and generate a keyboard signal input related to the user setting and function control of the mobile phone. Specifically, the input unit 1430 may include a touch panel 1431 and another input device 1432. The touch panel 1431, which may also be referred to as a touchscreen, may collect a touch operation of a user on or near the touch panel (such as an operation of a user on or near the touch panel 1431 by using any suitable object or accessory such as a finger or a stylus, and a space touch operation within a specific range on the touch panel 1431), and drive a corresponding connection apparatus according to a preset program. The touch panel 1431 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 1480, and receives and executes a command transmitted by the processor 1480. In addition, the touch panel 1431 may be implemented by using various types, such as a resistive type, a capacitive type, an infrared type, and a surface acoustic wave type. In addition to the touch panel 1431, the input unit 1430 may further include the another input device 1432. Specifically, the another input device 1432 may include, but not limited to, one or more of a physical keyboard, a functional key (such as a volume control key or a switch key), a track ball, a mouse, and a joystick.

The display unit 1440 may be configured to display information inputted by the user or information provided for the user, and various menus of the mobile phone. The display unit 1440 may include a display panel 1441. The display panel 1441 may be configured in the form of a liquid crystal display (LCD), an organic light-emitting diode (OLED), or the like. Further, the touch panel 1431 may cover the display panel 1441. After detecting a touch operation on or near the touch panel, the touch panel 1431 transfers the touch operation to the processor 1480, to determine a type of a touch event. Then, the processor 1480 provides a corresponding visual output on the display panel 1441 according to the type of the touch event. Although in FIG. 14, the touch panel 1431 and the display panel 1441 are used as two separate parts to implement input and output functions of the mobile phone, in some embodiments, the touch panel 1431 and the display panel 1441 may be integrated to implement the input and output functions of the mobile phone.

The mobile phone may further include at least one sensor 1450 such as an optical sensor, a motion sensor, and other sensors. Specifically, the optical sensor may include an ambient light sensor and a proximity sensor. The ambient light sensor may adjust luminance of the display panel 1441 according to brightness of the ambient light. The proximity sensor may switch off the display panel 1441 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1460, a speaker 1461, and a microphone 1462 may provide audio interfaces between the user and the mobile phone. The audio circuit 1460 may convert received audio data into an electrical signal and transmit the electrical signal to the speaker 1461. The speaker 1461 converts the electrical signal into a sound signal and outputs the sound signal. In addition, the microphone 1462 converts a collected sound signal into an electrical signal. After receiving the electrical signal, the audio circuit 1460 converts the electrical signal into audio data, and then outputs the audio data. After being processed by the processor 1480, the audio data is transmitted through the RF circuit 1410 to, for example, another mobile phone or the audio data is outputted to the memory 1420 for further processing.

Wi-Fi is a short distance wireless transmission technology. The mobile phone may help, by using the Wi-Fi module 1470, a user receive and transmit an email, browse a webpage, access stream media, and the like. This provides wireless broadband Internet access for the user. Although FIG. 14 shows the Wi-Fi module 1470, it may be understood that the Wi-Fi module is not a necessary component of the mobile phone, and the Wi-Fi module may be omitted as required provided that the scope of the essence of the present disclosure is not changed.

The processor 1480 is the control center of the mobile phone, and is connected to various parts of the mobile phone by using various interfaces and lines. By running or executing the software program and/or module stored in the memory 1420, and invoking data stored in the memory 1420, the processor performs various functions and data processing of the mobile phone, thereby performing overall monitoring on the mobile phone. The processor 1480 may include one or more processing units. The processor 1480 may integrate an application processor and a modem. The application processor mainly processes an operating system, a user interface, an application program, and the like. The modem mainly processes wireless communication. It may be understood that, the modem may either not be integrated into the processor 1480.

The mobile phone further includes the power supply 1490 (such as a battery) for supplying power to the components. The power supply may be logically connected to the processor 1480 by using a power management system, thereby implementing functions such as charging, discharging, and power consumption management by using the power management system.

Although not shown in the figure, the mobile phone may further include a camera, a Bluetooth module, and the like. Details are not repeated herein.

In this embodiment of the disclosure, the processor 1480 included in the terminal also has the function of performing each operation of the method for managing network live streaming data.

Figure 15:
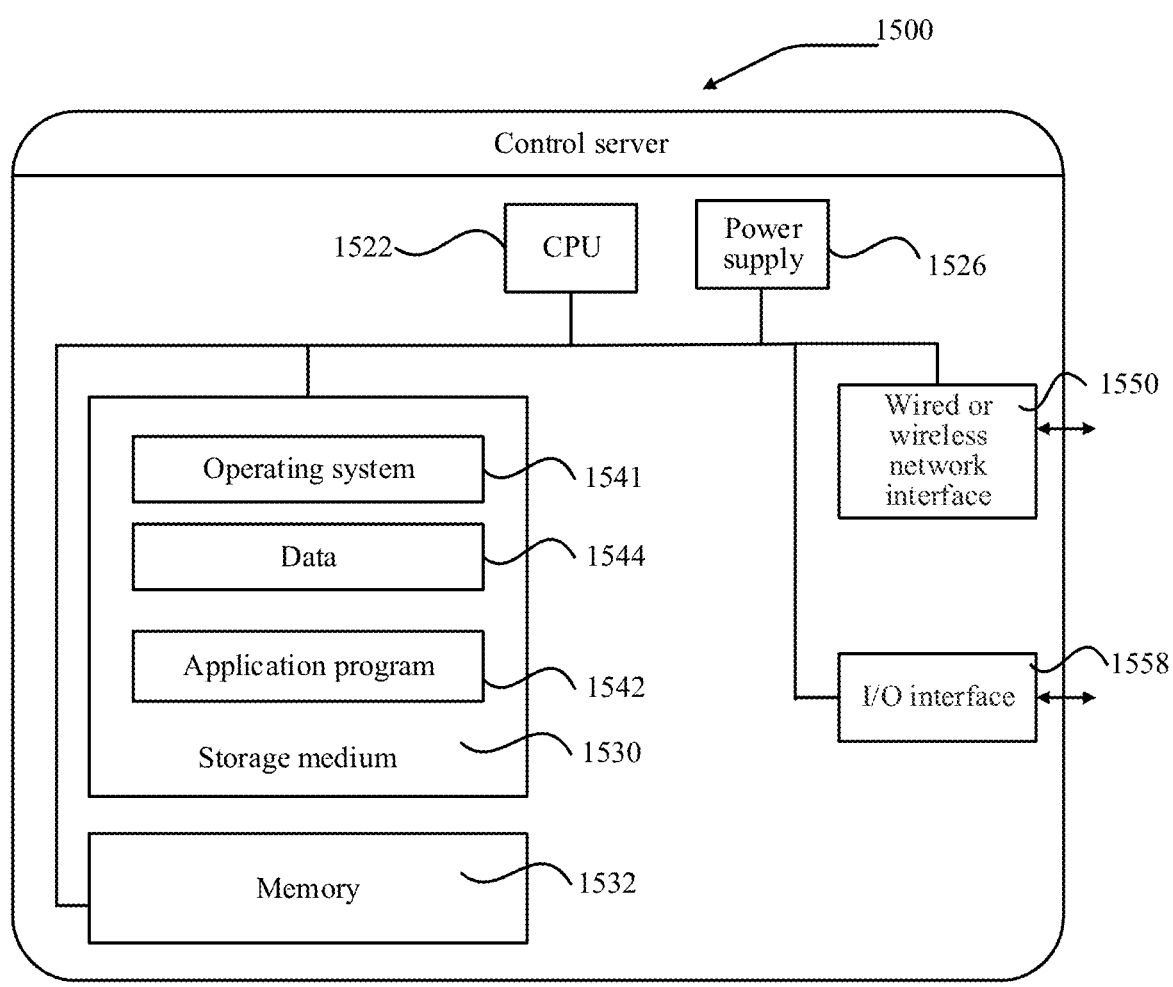
FIG. 15 is a schematic structural diagram of another control server according to an embodiment of the disclosure.

An embodiment of the disclosure further provides a control server. Referring to FIG. 15, FIG. 15 is a schematic structural diagram of another control server according to an embodiment of the disclosure. The control server 1500 may vary greatly due to different configurations or performance, and may include one or more CPUs 1522 (for example, one or more processors) and a memory 1532, and one or more storage media 1530 (for example, one or more mass storage devices) that store application programs 1542 or data 1544. The memory 1532 and the storage medium 1530 may implement non-transient storage, transient storage or permanent storage. A program stored in the storage medium 1530 may include one or more modules (not shown in the figure), and each module may include a series of instruction operations on the server. Further, the CPU 1522 may be configured to communicate with the storage medium 1530, and perform, on the server 1500, the series of instruction operations in the storage medium 1530.

The server 1500 may further include one or more power supplies 1526, one or more wired or wireless network interfaces 1550, one or more input/output (I/O) interfaces 1558, and/or one or more OSs 1541, for example, Windows Server™, Mac OS X™, Unix™, Linux™, or FreeBSD™.

The operations performed by the apparatus for managing network live streaming data in the foregoing embodiments may be based on the server structure shown in FIG. 15.

An embodiment of the disclosure further provides a computer-readable storage medium, storing data management instructions, the instructions, when run on a computer, causing the computer to perform the operations performed by the multipoint control device or the data access device in the methods in the embodiments of FIG. 3 and FIG. 4.

An embodiment of the disclosure further provides a computer program product including data management instructions, the instructions, when run on a computer, causing the computer to perform the operations performed by the multipoint control device or the data access device in the methods in the embodiments of FIG. 3 and FIG. 4.

An embodiment of the disclosure further provides a data management system, where the data management system may include the control server in the embodiment of FIG. 5 or the network device of FIG. 6.

A person skilled in the art can clearly understand that for convenience and conciseness of description, for specific working processes of the foregoing described system, apparatus, and unit, refer to the corresponding processes in the foregoing method embodiments, and details are not repeated herein.

In the several embodiments provided in the disclosure, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and components displayed as units may or may not be physical units, that is, may be located in one position, or may be distributed on a plurality of network units. Some or all of the units may be selected according to actual requirements to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the related art, all or some of the technical solutions may be implemented in a form of a software product. The computer software product is stored in a storage medium, and includes several instructions for instructing a computer device (which may be a personal computer, a data management apparatus, a network device, or the like) to perform all or some of the operations of the methods in the embodiments of the disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the disclosure, but not for limiting the disclosure. Although the disclosure is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of the disclosure.

What is claimed is:

1. A method for managing network live streaming data, performed by a computer device, the method comprising:
obtaining first load information of a first associated device of the computer device according to a preset period, load information indicating capability of an associated device;
determining address information of a second associated device according to second load information in response to the first load information not satisfying a preset condition, the preset condition being determined based on a connection status between a corresponding associated device and the computer device and a load status of the corresponding associated device;
performing address switching to switch from the first associated device to the second associated device according to the address information, tin response to the second load information of the second associated device satisfying the preset condition;
receiving a stream pushing request transmitted by a data access device, the stream pushing request comprising a stream pushing parameter, the stream pushing parameter being determined by the data access device based on a media content feature of to-be-transmitted stream pushing data, the stream pushing data comprising media content data from at least two data sources;
determining, according to the stream pushing parameter, a target port adapted to the media content feature;
transmitting target port information of the target port to the data access device so that the data access device synchronizes the target port to establish a connection;
receiving, through the target port, the stream pushing data transmitted by the data access device; and
pushing the stream pushing data to a live streaming device, so that the live streaming device plays the media content data in a network live streaming process.

2. The method according to claim 1, wherein determining the target port comprises:
receiving a stream mixing request transmitted by the data access device;
determining an idle port set according to the stream mixing request; and
selecting the target port from the idle port set according to the stream pushing parameter.

3. The method according to claim 1, wherein the pushing comprises:
determining a media content type of the stream pushing data;
classifying the stream pushing data according to the media content type, to determine a type of the stream pushing data; and
converting the stream pushing data into a target format corresponding to the type, and pushing the stream pushing data to the live streaming device.

4. The method according to claim 1, further comprising:
receiving a target parameter transmitted by the live streaming device, the target parameter being determined based on the media content feature in the network live streaming process; and
adjusting the stream pushing data according to the target parameter.

5. The method according to claim 1, further comprising:
receiving a page layout parameter transmitted by the data access device, the page layout parameter being used to indicate a page distribution status of the media content data from the at least two data sources in the data access device; and
adjusting the stream pushing data according to the page layout parameter.

6. The method according to claim 1, further comprising:
obtaining a target key transmitted by a policy scheduling device, the target key being used to indicate an address of the live streaming device; and
encrypting the stream pushing data according to the target key.

7. An apparatus for managing network live streaming data, comprising:
at least one memory configured to store program code; and
at least one processor configured to read the program code and operate as instructed by the program code, the program code comprising:
scheduling code configured to cause the at least one processor to: receive a stream pushing request transmitted by a data access device, the stream pushing request comprising a stream pushing parameter, the stream pushing parameter being determined by the data access device based on a media content feature of to-be-transmitted stream pushing data, the stream pushing data comprising media content data from at least two data sources;
adaptation code configured to cause the at least one processor to determine, according to the stream pushing parameter, a target port adapted to the media content feature and transmit target port information of the target port to the data access device so that the data access device synchronizes the target port to establish a connection;
media content code configured to cause the at least one processor to receive, through the target port, the stream pushing data transmitted by the data access device; and
stream pushing code configured to cause the at least one processor to push the stream pushing data to a live streaming device, so that the live streaming device plays the media content data in a network live streaming process,
wherein the scheduling code is further configured to cause the at least one processor to:
obtain first load information of a first associated device of a multipoint control device according to a preset period, load information indicating capability of an associated device;
determine address information of a second associated device according to second load information in response to the first load information not satisfying a preset condition, the preset condition being determined based on a connection status between a corresponding associated device and the multipoint control device and a load status of the corresponding associated device; and
perform address switching to switch from the first association device to the second associated device according to the address information, in response to the second load information of the second associated device satisfying the preset condition.

8. The apparatus according to claim 7, wherein the adaptation code is further configured to cause the at least one processor to:
receive a stream mixing request transmitted by the data access device;
determine an idle port set according to the stream mixing request; and
select the target port from the idle port set according to the stream pushing parameter.

9. The apparatus according to claim 7, wherein the stream pushing code is further configured to cause the at least one processor to:
determine a media content type of the stream pushing data;
classify the stream pushing data according to the media content type, to determine a type of the stream pushing data; and
convert the stream pushing data into a target format corresponding to the type, and pushing the stream pushing data to the live streaming device.

10. The apparatus according to claim 7, wherein the scheduling code is further configured to cause the at least one processor to:

receive a target parameter transmitted by the live streaming device, the target parameter being determined based on the media content feature in the network live streaming process; and the media content code is further configured to cause the at least one processor to adjust the stream pushing data according to the target parameter.

11. The apparatus according to claim 7, wherein the scheduling code is further configured to cause the at least one processor to:

receive a page layout parameter transmitted by the data access device, the page layout parameter being used to indicate a page distribution status of the media content data from the at least two data sources in the data access device; and the media content code is further configured to cause the at least one processor to adjust the stream pushing data according to the page layout parameter.

12. The apparatus according to claim 7, wherein the scheduling code is further configured to cause the at least one processor to:

obtain a target key transmitted by a policy scheduling device, the target key being used to indicate an address of the live streaming device; and the stream pushing code is further configured to cause the at least one processor to encrypt the stream pushing data according to the target key.

13. A non-transitory computer-readable storage medium, storing a computer program code that when executed by at least one processor causes the at least one processor to:

obtain first load information of a first associated device of a multipoint control device according to a preset period, load information indicating capability of an associated device;

determine address information of a second associated device according to second load information in response to the first load information not satisfying a preset condition, the preset condition being determined based on a connection status between a corresponding associated device and the multipoint control device and a load status of the corresponding associated device;

perform address switching to switch from the first associated device to for the second associated device according to the address information in response to the second load information of the second associated device satisfying the preset condition;

receive a stream pushing request transmitted by a data access device, the stream pushing request comprising a stream pushing parameter, the stream pushing parameter being determined by the data access device based on a media content feature of to-be-transmitted stream pushing data, the stream pushing data comprising media content data from at least two data sources;

determine, according to the stream pushing parameter, a target port adapted to the media content feature;

transmit target port information of the target port to the data access device so that the data access device synchronizes the target port to establish a connection;

receive, through the target port, the stream pushing data transmitted by the data access device; and push the stream pushing data to a live streaming device, so that the live streaming device plays the media content data in a network live streaming process.

14. The non-transitory computer-readable storage medium according to claim 13, wherein the determine the target port comprises:

receiving a stream mixing request transmitted by the data access device;

determining an idle port set according to the stream mixing request; and selecting the target port from the idle port set according to the stream pushing parameter.

15. The non-transitory computer-readable storage medium according to claim 13, wherein the push comprises:

determining a media content type of the stream pushing data;

classifying the stream pushing data according to the media content type, to determine a type of the stream pushing data; and converting the stream pushing data into a target format corresponding to the type, and pushing the stream pushing data to the live streaming device.

16. The non-transitory computer-readable storage medium according to claim 13, wherein the at least one processor is further configured to:

receive a target parameter transmitted by the live streaming device, the target parameter being determined based on the media content feature in the network live streaming process; and adjust the stream pushing data according to the target parameter.

17. The non-transitory computer-readable storage medium according to claim 13, wherein the at least one processor is further configured to:

receive a page layout parameter transmitted by the data access device, the page layout parameter being used to indicate a page distribution status of the media content data from the at least two data sources in the data access device; and adjust the stream pushing data according to the page layout parameter.

* * * * *